United States Patent
Schamer

(10) Patent No.: US 11,274,980 B2
(45) Date of Patent: Mar. 15, 2022

(54) DIMENSIONAL FORCE SENSING HITCH BALL

(71) Applicant: Brandon Schamer, Cincinnati, OH (US)

(72) Inventor: Brandon Schamer, Cincinnati, OH (US)

(*) Notice: Subject to any disclaimer, the term of this patent is extended or adjusted under 35 U.S.C. 154(b) by 34 days.

(21) Appl. No.: 16/845,396

(22) Filed: Apr. 10, 2020

(65) Prior Publication Data
US 2020/0355563 A1 Nov. 12, 2020

Related U.S. Application Data

(60) Provisional application No. 62/844,486, filed on May 7, 2019.

(51) Int. Cl.
| | | |
|---|---|---|
| *G01L 1/22* | (2006.01) | |
| *G01G 19/08* | (2006.01) | |
| *G01L 5/00* | (2006.01) | |
| *B60D 1/62* | (2006.01) | |
| *G08B 21/18* | (2006.01) | |
| *B60D 1/06* | (2006.01) | |

(52) U.S. Cl.
CPC ............... *G01L 1/22* (2013.01); *B60D 1/06* (2013.01); *B60D 1/62* (2013.01); *G01G 19/08* (2013.01); *G01L 5/0033* (2013.01); *G01L 5/0038* (2013.01); *G08B 21/182* (2013.01)

(58) Field of Classification Search
CPC ....... G01L 1/22; G01L 5/0033; G01L 5/0038; B60D 1/06; B60D 1/62; G01G 19/08; G08B 21/182
See application file for complete search history.

(56) References Cited

U.S. PATENT DOCUMENTS

| | | | | |
|---|---|---|---|---|
| 4,165,885 A | * | 8/1979 | Good | B60D 1/32 188/129 |
| 4,319,766 A | * | 3/1982 | Corteg | B60D 1/248 280/432 |
| 6,951,345 B2 | | 10/2005 | Wilks | |
| 9,464,953 B2 | | 10/2016 | Wirthlin | |
| 9,643,462 B2 | | 5/2017 | McAllister | |
| 9,870,653 B1 | | 1/2018 | Fritz et al. | |
| 10,309,824 B2 | | 6/2019 | Fredrickson | |
| 2006/0290102 A1 | * | 12/2006 | VanBuskirk | B60D 1/58 280/511 |
| 2011/0127752 A1 | * | 6/2011 | Drake | B60D 1/28 280/504 |
| 2018/0067001 A1 | | 3/2018 | Thierbach et al. | |
| 2018/0297427 A1 | | 10/2018 | McAllister | |
| 2019/0143769 A1 | | 5/2019 | Niedert et al. | |

(Continued)

*Primary Examiner* — Max H Noori
*Assistant Examiner* — Masoud H Noori
(74) *Attorney, Agent, or Firm* — Jenei LLC

(57) ABSTRACT

A hitch force monitoring system includes a hitch ball having a stem downward mountable to a vehicle drawbar. Two or more sensors are attached to the stem to respectively measure longitudinal and lateral forces on the hitch ball. A controller is communicatively coupled to the two or more sensors to receive the measured longitudinal and lateral forces and the user interface. The controller is communicatively coupled to a user interface device to indicate the measured longitudinal and lateral forces on the hitch ball that represent push, pull and sway forces of a trailer load attached to the hitch ball.

3 Claims, 4 Drawing Sheets

(56) References Cited

U.S. PATENT DOCUMENTS

| | | | |
|---|---|---|---|
| 2019/0241032 A1* | 8/2019 | Webster | B60D 1/36 |
| 2019/0381844 A1* | 12/2019 | Niedert | G01L 1/12 |
| 2020/0353782 A1* | 11/2020 | Niewiadomski | B60D 1/06 |
| 2021/0070357 A1* | 3/2021 | Niewiadomski | G05D 1/0246 |

\* cited by examiner

DIMENSIONAL FORCE SENSING HITCH BALL

CROSS-REFERENCE TO RELATED APPLICATIONS

This application claims the benefit of priority under 35 U.S.C. § 119(e) to U.S. patent application Provisional Application Ser. No. 62/844,486, entitled "DIMENSIONAL FORCE SENSING HITCH BALL", filed May 7, 2019, the contents of which are hereby incorporated by reference in their entirety for any purpose.

BACKGROUND

1. Technical Field

The present disclosure generally relates to force measurement devices, and more specifically to tow bar or draw bar force measurement devices.

2. Description of the Related Art

Vehicles and towing hardware are rated for towing loads. The limits can include an absolute maximum towing limit and a load weight limit that is to be shared between the towed trailer axle and the rear axle of the tow vehicle. Staying within the limits avoids a number of problems. Exceeding a rated threshold of pull force for a period of time can affect the reliability of the drive train. Exceeding axle weight can damage rears tires. Downward force on the draw bar can also reduce steering grip of the front tires of the tow vehicle. Determining the static forces on the tow vehicle during loading of the towed trailer can be difficult enough, but these forces are dynamically changed during motion in response changes in tow vehicle velocity and orientation to the towed trailer.

BRIEF SUMMARY

In one aspect, the present disclosure facilitates loading a towed trailer so that force limits are avoided. In addition, the present disclosure enables monitoring pulling, pushing and sway forces imparted by the towed trailer to the tow vehicle during motion. In one or more embodiments, a hitch force monitoring system includes a hitch ball having a stem downward mountable to a vehicle drawbar. Two or more sensors are attached to the stem to respectively measure longitudinal and lateral forces on the hitch ball. A controller is communicatively coupled to the two or more sensors to receive the measured longitudinal and lateral forces and the user interface. The controller is communicatively coupled to a user interface device to indicate the measured longitudinal and lateral forces on the hitch ball that represent push, pull and sway forces of a trailer load attached to the hitch ball.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to aspects of the present disclosure, a dimensional force sensing hitch ball senses forces applied by a trailer to a tow vehicle in all directions in respect to a hitch. These force measurements are processed and displayed it in a number of possible ways such as trend plots, current measurements, and maximum measurements since a previous reset.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

Figure 1:
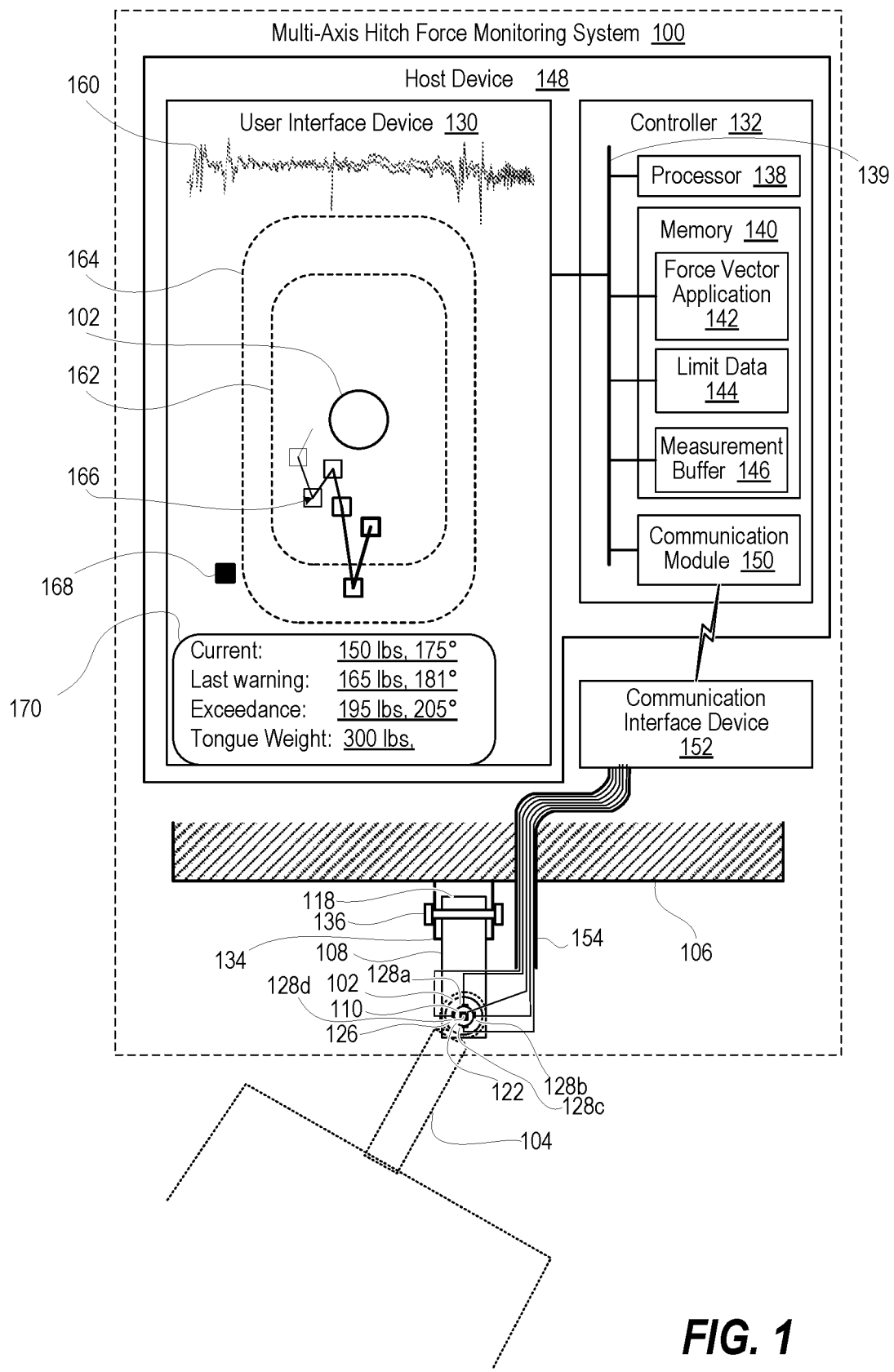
FIG. 1 is functional block diagram of a multi-axis hitch force measuring system that is mounted on a tow vehicle and a dimensional force sensing tow or hitch ball attached to a towed trailer, according to one or more embodiments.
Figure 2:
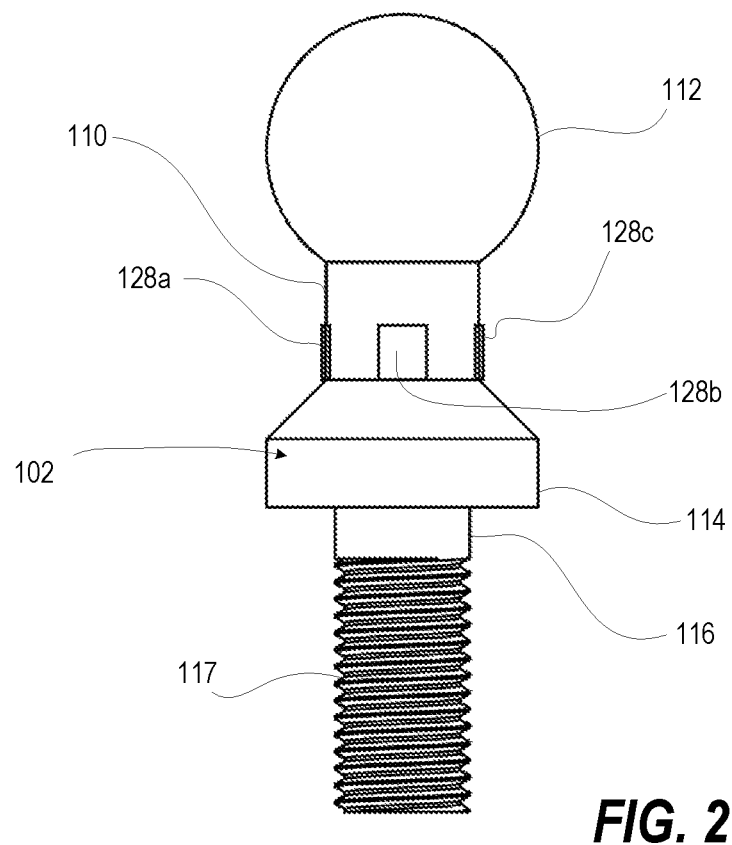
FIG. 2 is a side view of the dimensional force sensing hitch ball, according to one or more embodiments.
Figure 3:
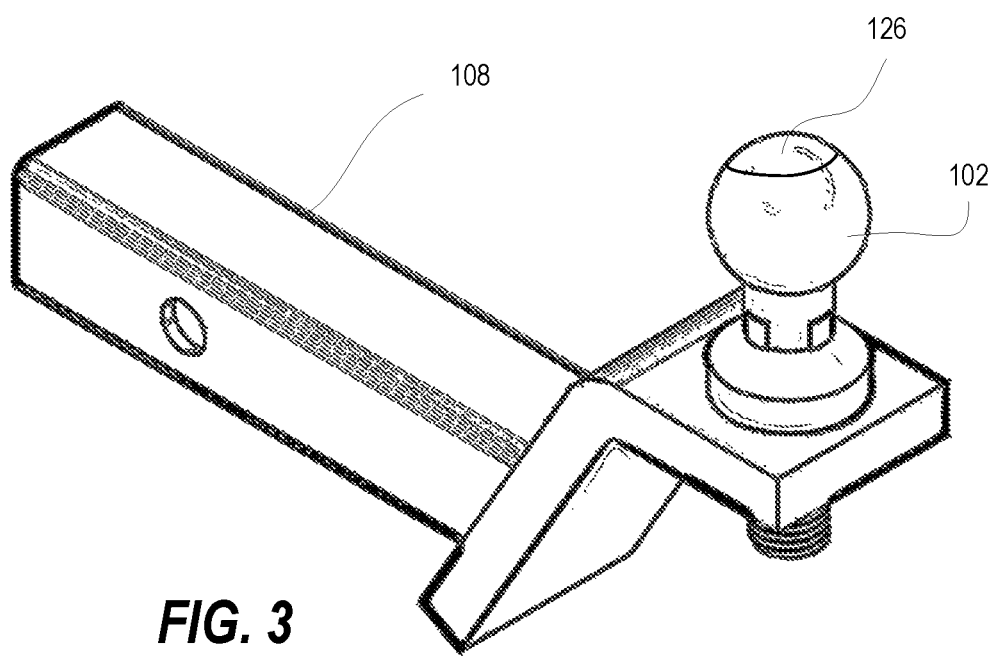
FIG. 3 is an isometric view of the hitch ball attached to a draw bar, according to one or more embodiments.
Figure 4:
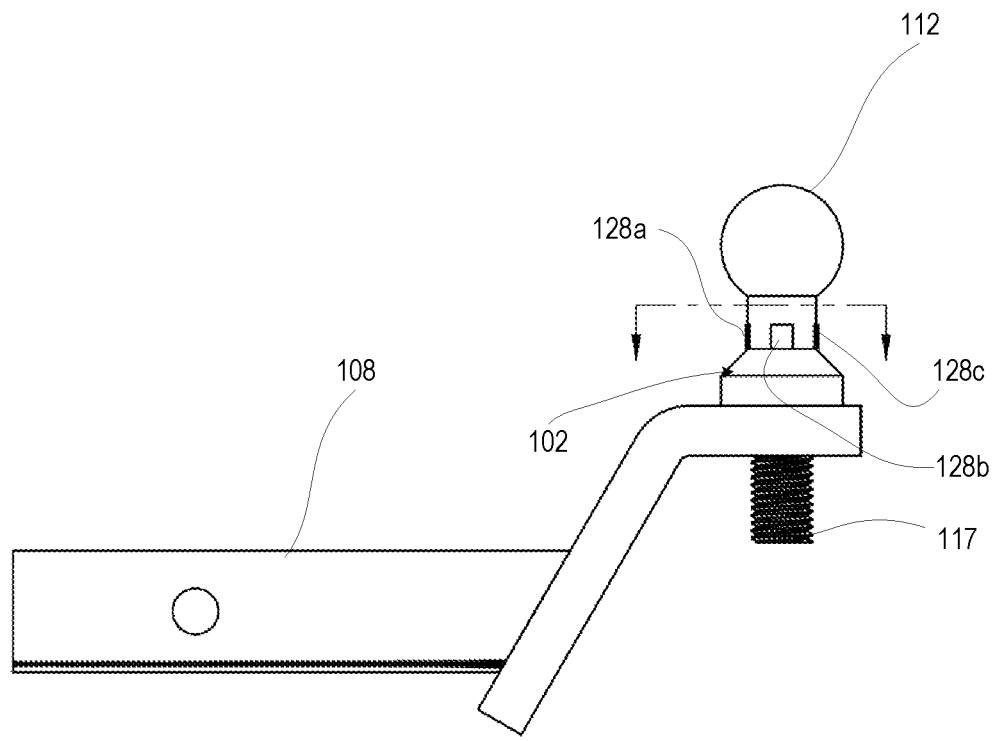
FIG. 4 is a side view of the draw bar with the hitch ball of FIG. 3, according to one or more embodiments.
Figure 5:
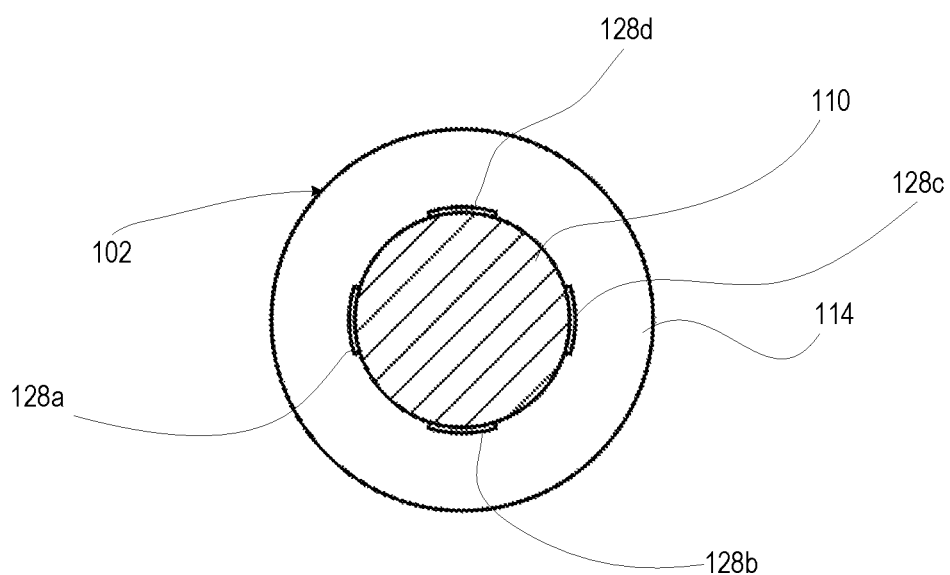
FIG. 5 is a top cross sectional view along lines A-A of the hitch ball of FIG. 4, according to one or more embodiments.

FIG. 1 illustrate a hitch force monitoring system 100 having a dimensional force sensing hitch ball 102 that senses forces applied by a towed trailer 104 to a tow vehicle 106 in all directions in respect to a hitch 108. In one or more embodiments, FIG. 2 illustrates a hitch ball 102 having a narrower stem 110 attached between an upper sphere 112 and a base 114. A pin 116 having an outer diameter threaded portion 117 extends below the base 114. FIGS. 3-4 illustrate that the pin 116 extends through a vertical hole in a draw bar 118 of a hitch 120. The base 114 is engaged to a top surface 124 of the draw bar 118 by a nut (not shown) received on the pin 116 from below. Two or more sensors are attached to the stem 110 to respectively measure longitudinal and lateral forces as well as vertical forces on the hitch ball 102. In one or more embodiments, FIG. 5 illustrates that four orthogonally oriented strain sensors 128a-128d are mounted respectively to the front, right, back, and left sides of the stem 110 to sense push, right sway, pull and left sway as well as the weight exerted onto the hitch ball 102. In one or more embodiments, FIG. 2 illustrates the four orthogonally oriented strain sensors 128a-128d sense downward force such as static weight exerted by the towed trailer 104. The hitch ball includes a unitary upper sphere 112. In one or more alternate embodiments, FIG. 3 illustrates a top weight transducer sensor 126 that is mounted on a top of the upper sphere 122 to sense downward force such as static weight exerted by the towed trailer 104.

Returning to FIG. 1, the hitch force monitoring system 100 includes a user interface device 130. In one or more embodiments, the user interface device 130 is provided by a smartphone or other user equipment. In one or more embodiments, the user interface device 130 is remote display. The hitch force monitoring system 100 includes a controller 132 that is communicatively coupled to the four sensors 128a-128d to receive the measured longitudinal and lateral forces and the top weight transducer sensor 126 to sense downward force. The controller 132 is communicatively coupled to the user interface device 130 to indicate the measured longitudinal and lateral forces on the hitch ball 102 that represent push, pull and sway forces of a trailer load attached to the hitch ball 102. The forces are transferred to the tow vehicle 106 via the draw bar 118 that is received in frame-mounted hitch receptacle 134 and engaged by hitch pin 136.

In one or more embodiments, the controller 132 includes a processor 138 that controls the communication, user interface device 130, and other functions and/or operations of the hitch force monitoring system 100. These functions and/or operations include, but are not limited to including, application data processing and signal processing. The hitch force monitoring system 100 may use hardware component equivalents for application data processing and signal processing. For example, the hitch force monitoring system 100 may use special purpose hardware, dedicated processors, general purpose computers, microprocessor-based computers, micro-controllers, optical computers, analog computers, dedicated processors and/or dedicated hard wired logic. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 139) are illustrated in FIG. 1, it is to be understood that more, fewer, or different interconnections may be present in other embodiments.

In one or more embodiments, the processor 132 executes program code to provide functionality of the hitch force monitoring system 100. Processor 138 includes one or more central processing units (CPUs). Processing subsystem 132 can include a digital signal processor (DSP). Controller 132 includes a system memory 140 for containing actively used program code and data. System memory 140 can include therein a plurality of such program code and modules, including applications such as force vector application 142. System memory 140 can also include operating system (OS), firmware interface such as basic input/output system (BIOS) or Uniform Extensible Firmware Interface (UEFI), and platform firmware (not shown). These software and/or firmware modules have varying functionality when their corresponding program code is executed by processor 132 or secondary processing devices within the hitch force monitoring system 100. Data, such as force limit data 144 and a measurement buffer 146, is stored in system memory 140.

In one or more embodiments, a host device 148 such as a smart phone includes the user interface device 130 and the controller 132. Host device 148 can utilize a communication module 150 to link via a wireless local access network (WLAN) such as Wi-Fi, personal access network (PAN) such as BLUETOOTH, or wireless wide area network (WWAN) such as LTE, to a communication interface device 152 that is electrically connected via cable 154 to sensors 126 and 128a-128d.

User interface device 130 can present the force/weight measurement data in a number of ways. A trend plot 160 can show a running trace of the data. A two-dimensional (2D) plot 162 can include a first threshold shape 162 surrounded by a second threshold shape 164. The former can represent a force range to stay within to avoid degrading reliability of the tow vehicle 106 or hitch 108. The latter second threshold shape 164 can indicate a level that can result in failure. A 2D trend line 166 can show dimensional forces. Exceedance value 168 can be shown graphically and as part of an alphanumeric data indication 170. In one or more embodiments, the user interface device 130 has a simplified user interface showing weights, forces as well as a simplified "Go/No Go" level indicator.

Figure 6:
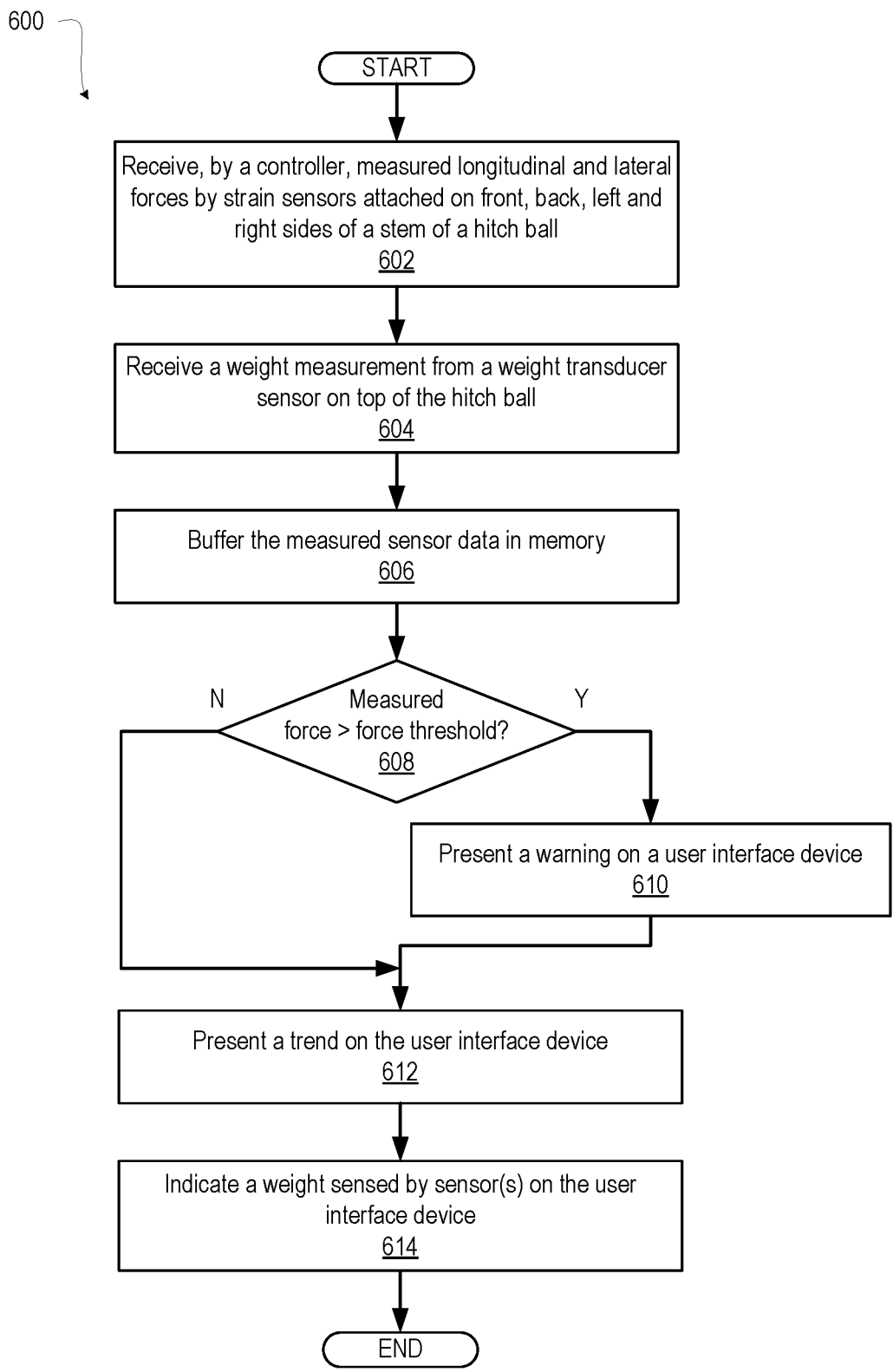
FIG. 6 is a flow diagram of a method for dimensional force monitoring of a hitch ball, according to one or more embodiments.

FIG. 6 illustrates a flow diagram of a method 600 for dimensional force monitoring of a hitch ball. In one or more embodiments, the method 600 includes receiving, by a controller, measured longitudinal and lateral forces by strain sensors attached on front, back, left and right sides of a stem of a hitch ball (block 602). Method 600 includes receiving a weight measurement calculated from the oriented strain sensors on the sides of the hitch ball stem 110 (block 604). Method 600 includes buffering the measured sensor data in memory (block 606). Method 600 includes determining whether the sensors indicate a measured force that exceeds the force threshold (decision block 608). In response to determining that the measured force exceed the force threshold, method 600 includes presenting a warning on a user interface device (block 610). In response to determining that the measured force does not exceed the force threshold in decision block 608 or after block 610, method 600 includes presenting a trend on the user interface device (block 612). Method 600 includes indicating a weight sensed by the sensor(s) on the user interface device (block 614). Then method 600 ends.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof.

Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A hitch force monitoring system comprising:
   a hitch ball having a stem downward mountable to a vehicle drawbar;
   two or more sensors attached to the stem to respectively measure longitudinal and lateral forces on the hitch ball, wherein the two or more sensors comprise four strain sensors mounted respectively on the front, back, left and right sides to respectively measure push, pull, left sway, and right sway, and wherein the two or more sensors further comprise a weight transducer sensor mounted on the hitch ball to measure downward force from the towed trailer;
   a user interface device;
   a controller communicatively coupled to: (i) the two or more sensors to receive the measured longitudinal and lateral forces; and (ii) the user interface device to indicate the measured longitudinal and lateral forces on the hitch ball that represent push, pull and sway forces of a trailer load attached to the hitch ball; wherein the controller indicates a weight sensed by the weight transducer sensor on the user interface device;
   and, wherein the controller determines whether the two or more sensors indicate a measured force that exceeds a force threshold, and in response to determining that the measured force exceeds the force threshold, presenting a warning on the user interface device;
   a host device comprising the user interface device, the controller, and a wireless communication module; and
   a communication interface device electrically connected to the two or more sensors and communicatively coupled to the wireless communication module of the host device.

2. The hitch force monitoring system of claim 1, further comprising a memory containing a data buffer, wherein the controller:
   maintains the measured longitudinal and lateral forces in the data buffer as a first in first out (FIFO); and
   presents a trend of the FIFO on the user interface device.

3. The hitch force monitoring system of claim 1, wherein the host device comprises a smart phone.

* * * * *